US008543926B2

(12) United States Patent
Giles

(10) Patent No.: US 8,543,926 B2
(45) Date of Patent: *Sep. 24, 2013

(54) MANAGING ITEM ACCESS IN A COLLABORATIVE WORKSPACE

(75) Inventor: Jason D. Giles, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 988 days.

This patent is subject to a terminal disclaimer.

(21) Appl. No.: 12/136,071

(22) Filed: Jun. 10, 2008

(65) Prior Publication Data

US 2009/0307598 A1    Dec. 10, 2009

(51) Int. Cl.
  *G06F 3/14*    (2006.01)
(52) U.S. Cl.
  USPC ............ 715/751; 716/11; 716/137; 709/204; 707/9; 345/419; 345/581
(58) Field of Classification Search
  USPC ......... 715/200–277, 700–867; 700/701–866; 709/201–229; 705/50–79; 345/30–111; 348/206–231.9
  See application file for complete search history.

(56) References Cited

U.S. PATENT DOCUMENTS

| | | | |
|---|---|---|---|
| 5,107,443 A | 4/1992 | Smith et al. | |
| 5,533,183 A | 7/1996 | Henderson et al. | |
| 6,289,460 B1 | 9/2001 | Hajmiragha | |
| 6,564,246 B1 | 5/2003 | Varma | |
| 6,629,129 B1 | 9/2003 | Bookspan et al. | |
| 6,744,447 B2 | 6/2004 | Estrada et al. | |
| 7,233,951 B1 | 6/2007 | Gainer et al. | |
| 7,546,571 B2 * | 6/2009 | Mankin et al. | 716/137 |
| 7,609,257 B2 * | 10/2009 | Wright et al. | 345/419 |
| 7,933,952 B2 * | 4/2011 | Parker et al. | 709/204 |
| 2003/0046134 A1 | 3/2003 | Frolick et al. | |
| 2003/0065722 A1 | 4/2003 | Ieperen | |
| 2003/0120593 A1 | 6/2003 | Bansal et al. | |
| 2003/0135565 A1 | 7/2003 | Estrada | |
| 2004/0088647 A1 | 5/2004 | Miller et al. | |
| 2004/0128150 A1 | 7/2004 | Lundgren | |
| 2005/0010640 A1 | 1/2005 | Cannata et al. | |
| 2005/0097440 A1 | 5/2005 | Lusk et al. | |
| 2005/0114475 A1 | 5/2005 | Chang et al. | |
| 2005/0138566 A1 | 6/2005 | Muller et al. | |
| 2005/0160145 A1 | 7/2005 | Gruen et al. | |
| 2005/0216556 A1 | 9/2005 | Manion et al. | |
| 2006/0026502 A1 | 2/2006 | Dutta | |
| 2006/0036692 A1 | 2/2006 | Morinigo et al. | |

(Continued)

OTHER PUBLICATIONS

Adler, et al., "Evaluating and Implementing a Collaborative Office Document System," Interacting with Computers, vol. 18 Issue 4, Jul. 2006, pp. 665-682.

(Continued)

*Primary Examiner* — Ruay Ho
(74) *Attorney, Agent, or Firm* — Turk IP Law, LLC

(57) ABSTRACT

An approach is described for managing item access in a collaborative workspace. A user interacts with the collaborative workspace through a workspace user interface presentation. The approach entails presenting an item user interface presentation to the user without losing a context associated with the workspace user interface presentation. The user can enter searching and filtering selections into the item user interface presentation to narrow an initial set of items provided by that presentation. Upon locating a desired item, the user can add it to the collaborative workspace using a drag-and-drop operation or other technique.

20 Claims, 14 Drawing Sheets

(56) References Cited

U.S. PATENT DOCUMENTS

| | | | |
|---|---|---|---|
| 2006/0080432 A1 | 4/2006 | Spataro et al. | |
| 2006/0101368 A1* | 5/2006 | Kesarwani et al. | 716/11 |
| 2006/0123347 A1 | 6/2006 | Hewitt et al. | |
| 2007/0165044 A1* | 7/2007 | Wells et al. | 345/581 |
| 2007/0168340 A1 | 7/2007 | Mahoney et al. | |
| 2007/0233811 A1 | 10/2007 | Rochelle et al. | |
| 2007/0288292 A1 | 12/2007 | Gauger | |
| 2008/0005235 A1 | 1/2008 | Hegde et al. | |
| 2008/0104052 A1 | 5/2008 | Ryan et al. | |
| 2008/0320000 A1* | 12/2008 | Gaddam | 707/9 |

OTHER PUBLICATIONS

Tsai, et al., "A Document Workspace for Collaboration and Annotation Based on XML Technology," Proceedings International Symposium on Multimedia Software Engineering, 2000, pp. 165-172.

Search Report and Written Opinion for PCT/US2009/043424, international filing date May 11, 2009 mailed on Dec. 23, 2009.

Pankoke-Babatz et al., "Collaborative Workspace for Time Deferred Electronic Cooperation," Proceedings of the International AMC SIG-GROUP Conference on Supporting Group Work: the Integration Challenge, 1997, pp. 187-196.

Bentley, et al., Supporting Collaborative Information Sharing with the World Wide Web: The BSCW Shared Workspace System, Proceedings of the 4$^{th}$ International WWW Conference, Issue 1, Dec. 1995, pp. 63-74.

Muldner, et al., "An Experiment with Computer-Supported Cooperative Work: Shared Workspace", WebNet 1999 Association for the Advancement of Computing in Education (AACE), 1999 pp. 788-793.

Search Report and Written Opinion for PCT/US2009/043039, international filing date May 6, 2009 mailed on Dec. 23, 2009.

* cited by examiner

MANAGING ITEM ACCESS IN A COLLABORATIVE WORKSPACE

BACKGROUND

A collaborative workspace (henceforth "workspace") refers to functionality that allows individuals to work on a shared task in a coordinated fashion. A typical workspace defines permissions which identify a collection of members who are permitted to interact with the workspace. The permissions also define the manner in which the respective members are permitted to interact with the workspace. The workspace also commonly defines a collection of items (e.g., document items, etc.) associated with the workspace. In operation, authorized members may engage the workspace (in a manner defined by the permissions) to work on the shared items in a coordinated fashion.

In one approach, a user may add items to a workspace in a generally manual and ad hoc manner. For example, the user may interact with a separate general purpose tool for accessing items stored in a particular repository. The user may then add the accessed items to the workspace. The user performs this task by suspending her work in the workspace and activating the separate tool. If the user is interested in accessing items stored in different repositories, she may find it appropriate to use multiple different access tools. This approach has potential shortcomings. For instance, the user may find it a burdensome, disruptive, and error-prone task to access and interact with the separate item access tool or tools in an ad hoc manner.

SUMMARY

According to one illustrative implementation, an approach is described for managing item access in a collaborative workspace. The approach entails presenting a workspace user interface presentation to a user, which allows the user to interact with the collaborative workspace. The approach also entails presenting an item user interface presentation to the user without losing a context associated with the workspace user interface presentation. The item user interface presentation identifies an initial set of items (such as document items, etc.) on which action can be taken. The initial set of items may be selected from a plurality of sources.

According to another illustrative feature, the user may take action by entering a search selection. In response, the item user interface presentation displays a modified set of items that excludes items from the initial set of items that do not satisfy the search selection. Again, the modified set of items is presented without losing a context associated with the workspace user interface presentation.

According to another illustrative feature, the user may take action by entering a filtering selection. In response, the item user interface presentation displays a modified set of items that excludes items from the initial set of items that do not satisfy the filtering selection. Again, the modified set of items is presented without losing a context associated with the workspace user interface presentation.

According to another illustrative feature, the user may take action by adding a selected item to the collaborative workspace from the item user interface presentation. This operation may entail using a drag-and-drop operation to move the selected item from the item user interface presentation to the workspace user interface presentation.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

An approach is described for managing item access in a collaborative workspace. A user interacts with the collaborative workspace through a workspace user interface presentation. The approach entails presenting an item user interface presentation to a user without losing a context associated with the workspace user interface presentation. The user can enter searching and filtering selections into the item user interface presentation to successively narrow an initial set of items provided by the item user interface presentation. Upon locating a desired item, the user can add the item to the collaborative workspace using a drag-and-drop operation or other technique.

By virtue of this approach, a user can add items to the collaborative workspace in an efficient and user-friendly manner. For instance, the user can add items to the collaborative workspace without losing her main focus on the workspace user interface presentation. Moreover, the user is not asked to perform disparate procedures when adding items from multiple different sources. More generally, the concepts disclosed herein may address one or more of the challenges or problems previously noted, but are not limited to addressing all or any of these challenges or problems.

As used herein, the term "user" is used to describe the person who performs the process of managing items using the above-summarized approach, e.g., by adding items to the collaborative workspace. The term "members" refers to individuals who are assigned rights to access and interact with the workspace, where such rights are defined by permissions. The person that manages items (e.g., the user) will typically also be defined as a member, although need not be.

This disclosure is organized as follows. Section A describes illustrative systems for managing item access in a collaborative workspace. Section B describes illustrative methods for performing the same functions. Section C describes illustrative processing functionality that can be used to implement any aspect of the features described in Sections A and B.

A. Illustrative Systems

Figure 14:
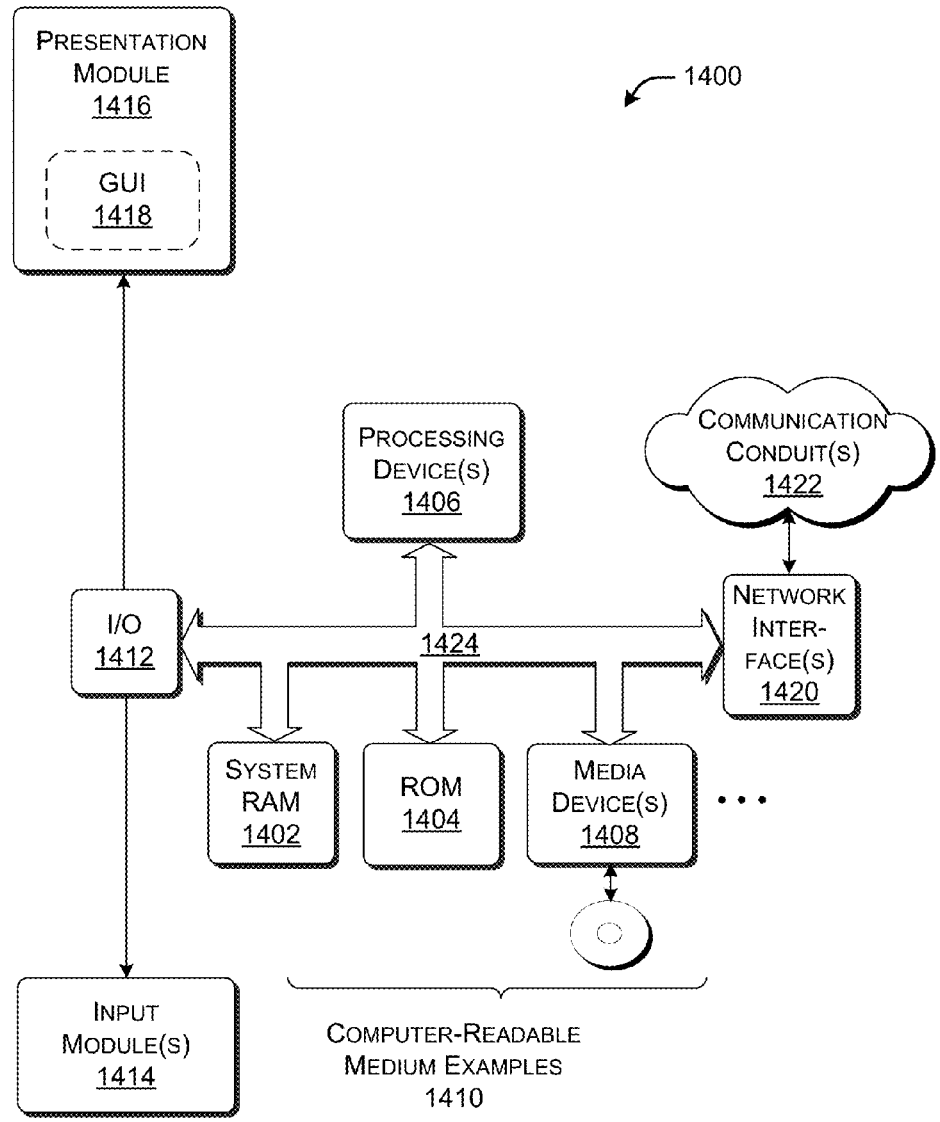
FIG. 14 shows illustrative processing functionality that can be used to implement any aspect of the features shown in the foregoing drawings.

As a preliminary matter, the various components shown in the figures can be implemented in any manner, for example, by software, hardware, firmware, manual processing operations, and so on, or any combination of these implementations. The phrase "configured to" refers to any way of providing a function, and may encompass any implementation or combination thereof (software, hardware, firmware, manual processing operations, and so on). FIG. 14, to be discussed in turn, provides additional details regarding one illustrative implementation of the functions shown in the figures.

Figure 1:
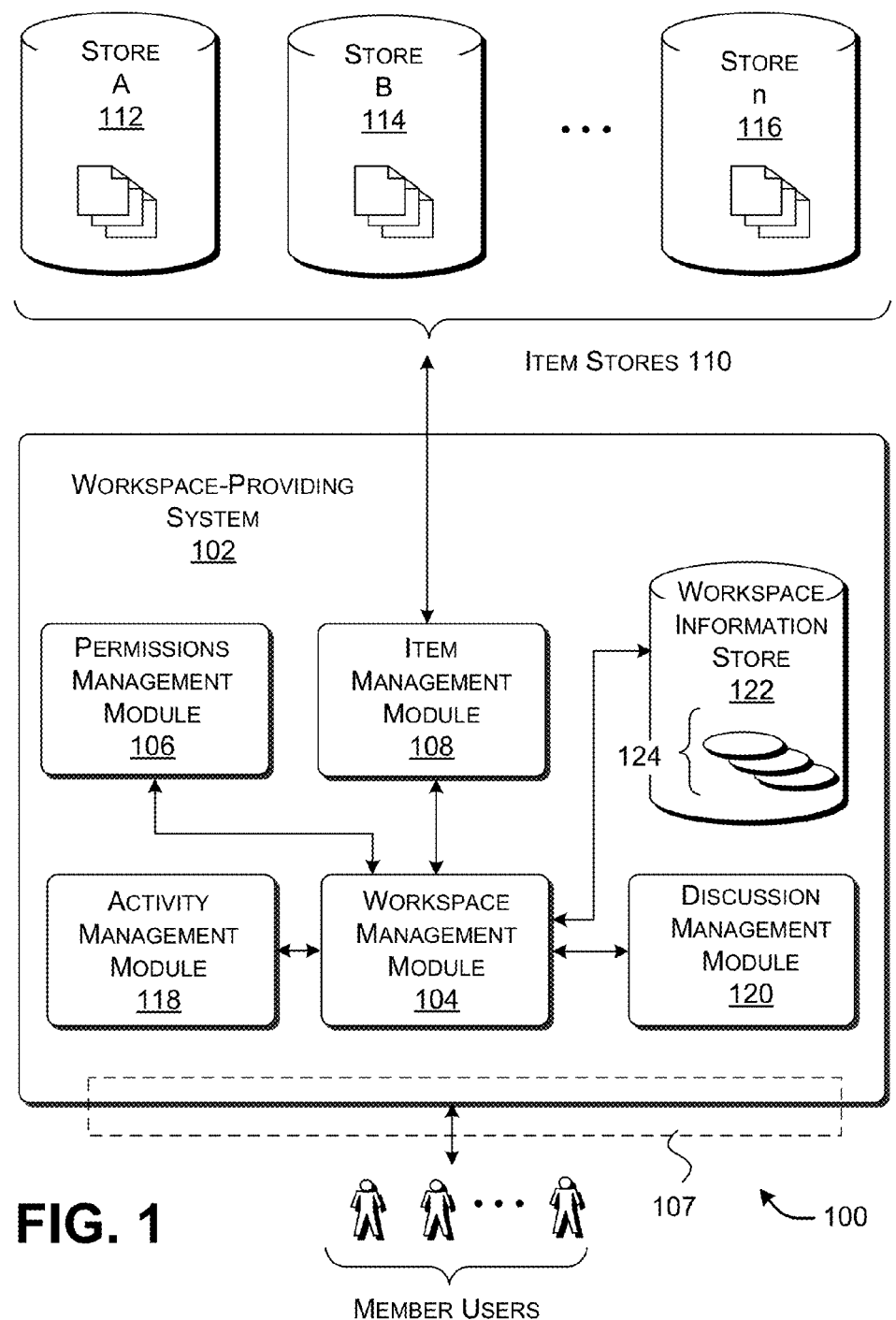
FIG. 1 shows an illustrative workspace-providing system for providing a collaborative workspace.

FIG. 1 shows a workspace-using environment 100. The workspace-using environment 100 includes a workspace-providing system 102. The workspace-providing system 102 provides a collaborative workspace (henceforth simply "workspace"). A workspace defines functionality which allows individuals to work on one or more shared tasks. The workspace includes permissions which define the individuals who are permitted to work on the workspace (referred to as "members" herein). The workspace also includes items (document items, data items, discussion items, etc.) that the members are permitted to work on in a collaborative fashion. In operation, authorized members may engage the workspace to work on the shared items in a coordinated fashion.

Figure 4:
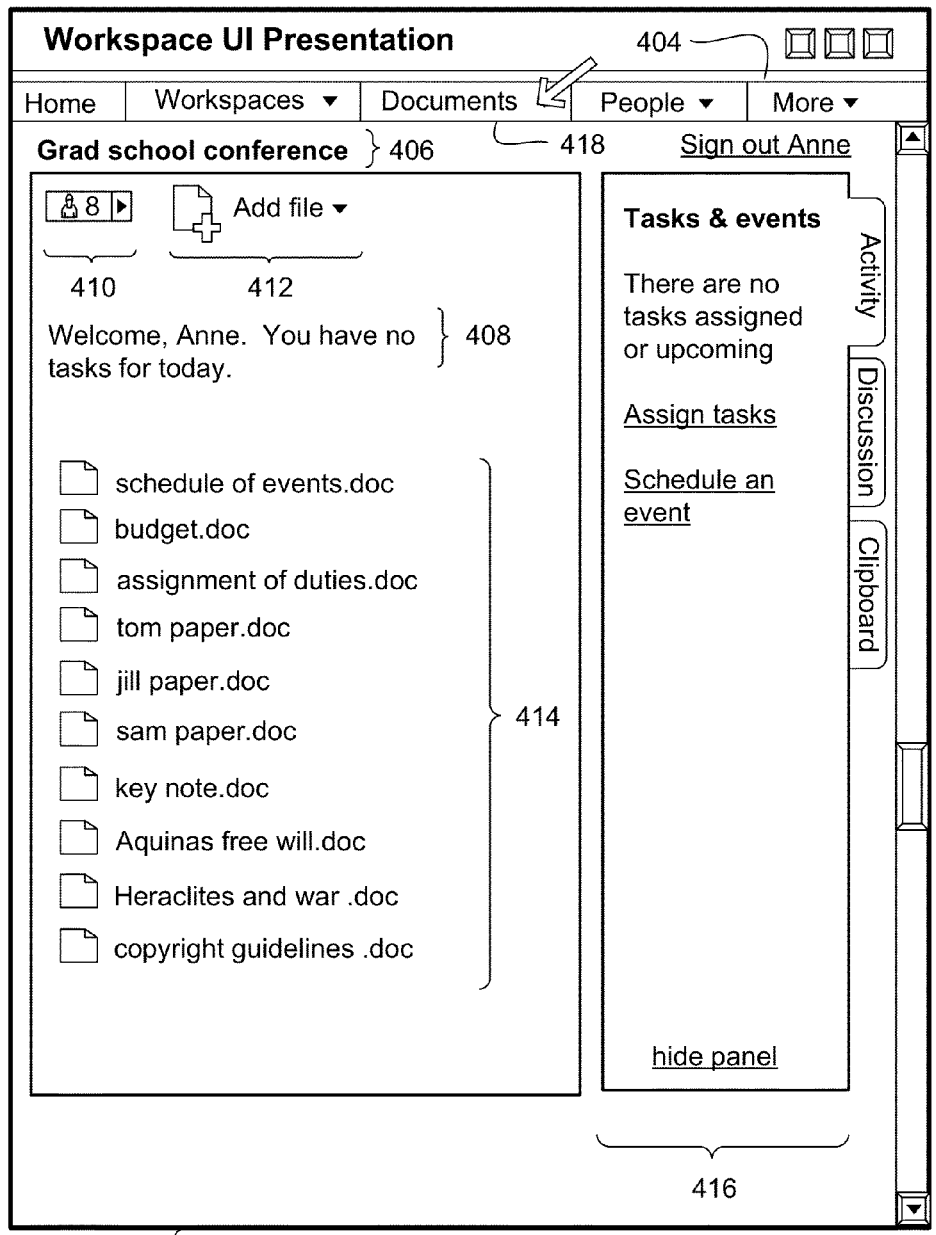
FIG. 4 shows an illustrative workspace user interface presentation provided by the workspace-providing system of FIG. 1.

The workspace-providing system 102 includes, or can be conceptualized to include, a collection of components. More specifically, FIG. 1 is a logical depiction of the workspace-providing system 102. In the logical depiction, the components perform different prescribed functions (to be described below). The logical functions may map to physical infrastructure in different ways. For example, the workspace-providing system 102 includes a workspace management module 104. The workspace management module 104 manages the general set-up and operation of a workspace. In doing so, the workspace management module 104 can be conceptualized as providing a main workspace user interface (UI) presentation (as shown in FIG. 4) through which members may interact with the workspace. In a physical implementation, however, these logical functions may be performed by a combination of backend functionality and frontend functionality. For instance, a physical implementation of the workspace-providing system 102 may include an interface component 107 which performs the task of interfacing with members (and which thus implements all of the user interface presentations provided by the workspace-providing system 102, including the workspace UI presentation). Accordingly, reference to the workspace management module 104 should be understood as referring to whatever combination of functionality is used to perform its associated functions, however allocated among one or more components in a physical implementation. The same explanation applies to other logical components within the workspace-providing system 102.

The workspace management module 104 interacts with a permissions management module 106. The permissions management module 106 allows a user to grant individuals the right to access the workspace, thus assigning these individuals the status of members. The permissions management module 106 also allows the user to define the permission level of members. Illustrative permission levels include an owner permission level, and editor permission level, and a viewer permission level. A member who is assigned an owner permission level enjoys certain administrative rights with respect to the workspace, such as the ability to set up, manage, and terminate the workspace. (In general, the specific set of rights assigned to an owner-member may be environment-specific; for instance, different companies may decide to grant owner-members different respective sets of privileges.) A member who is assigned an editor permission level has the right to make changes to the workspace items. A member who is assigned a viewer permission level has the right to view the workspace items, but does not have the right to makes changes to the workspace items.

The workspace management module 104 may also interact with an item management module 108. The item management module 108 identifies candidate items that a user may wish to add to the workspace. Adding an item to a workspace has the effect of "placing" the item in a shared location where it can be accessed and acted upon by members of the workspace (as defined by the respective permissions of the members). The items can include any type of information, including document items (word processing document items, spreadsheet document items, presentation-related document items, and so on), data items, discussion items, and so on. No limitation is placed on what may constitute an item as used herein.

More specifically, the item management module 108 provides (or can be logically conceptualized to provide) an item UI presentation. Upon activation, the item UI presentation provides an initial set of items to the user. As stated, these items represent candidate items that a user may wish to add to the workspace. The item UI presentation further provides functionality that allows the user to find a particular item (or items) in the initial set of items by entering search selections and filtering selections. For instance, upon entry of a search selection, the item management module 108 will exclude that subset of the initial set of items that do not match the search selection. Upon entry of a filtering selection, the item management module 108 will further narrow the remaining items to exclude those items that do not match the filtering selection. Upon finding a desired item, the user can move the item to the workspace, e.g., using a drag-and-drop procedure, or other method. Later figures will illustrate each of the above-summarized operations in greater detail.

The item management module 108 may cull items from plural item stores 110, including representative item store A 112, item store B 114, and item store n 116. Accordingly, the initial set of candidate items presented in the item UI presentation may include items from the plural item stores 110. To perform this function, the item management module 108 can identify the stores 110 that contain items which may be relevant to a particular workspace under consideration. The item management module 108 then interacts with the identified stores 110 to select items to be included in the initial set of items provided in the item UI presentation. Further details regarding this operation are provided below.

In general, the item management module 108 is configured to display the item UI presentation without losing a context associated with the main workspace UI presentation. In other words, the item UI interface is displayed inline with respect to the main workspace UI presentation. This helps the user maintain her focus when performing tasks using the workspace UI presentation. Moreover, as discussed, the item management module 108 provides a uniform approach for interacting with items from plural stores 110. This aspect helps reduce the complexity of the task of adding items to a workspace when the items are scattered across multiple locations.

The workspace management module 104 may also interact with an activity management module 118. The activity management module 1118 manages tasks associated with the workspace. For example, the activity management module 118 can be used by the user to set up tasks for one or more workspace members. The activity management module 118 may also provide information regarding tasks that the user is asked to performed. The activity management module 118 can also provide various notifications to members. For example, the activity management module 118 can alert a member regarding who has used (or who has failed to use) the workspace within a specified period of time.

The workspace management module 104 may also interact with a discussion management module 120. The discussion management module 120 manages communication among workspace members. For instance, the discussion management module 120 can maintain a blog-type message thread which captures the exchange of messages among members. The discussion management module 120 can allow a member to reply to an existing message, start a new message thread, and so on.

The enumeration of logical modules in FIG. 1 is illustrative. Other implementations can include additional modules. In addition, or alternatively, other implementations can omit one or more modules shown in FIG. 1.

The result of setting up a workspace will be workspace information. The workspace information defines a linked collection of members, permissions, items, activities, notifications, and so on. A workspace information store 122 can be used to store workspace information 124 associated with different respective workspaces (represented in the figure as ovals). In one case, the workspace information store 124 can store an actual copy of the items that are included in a workspace. Alternatively, or in addition, the workspace information store 124 can store reference pointers which point to various workplace items that are stored elsewhere. A workspace itself is a logical concept. That is, a workspace corresponds to a logical "space" that is defined by workspace information in conjunction with the functionality used to interact with the workspace information.

Figure 2:
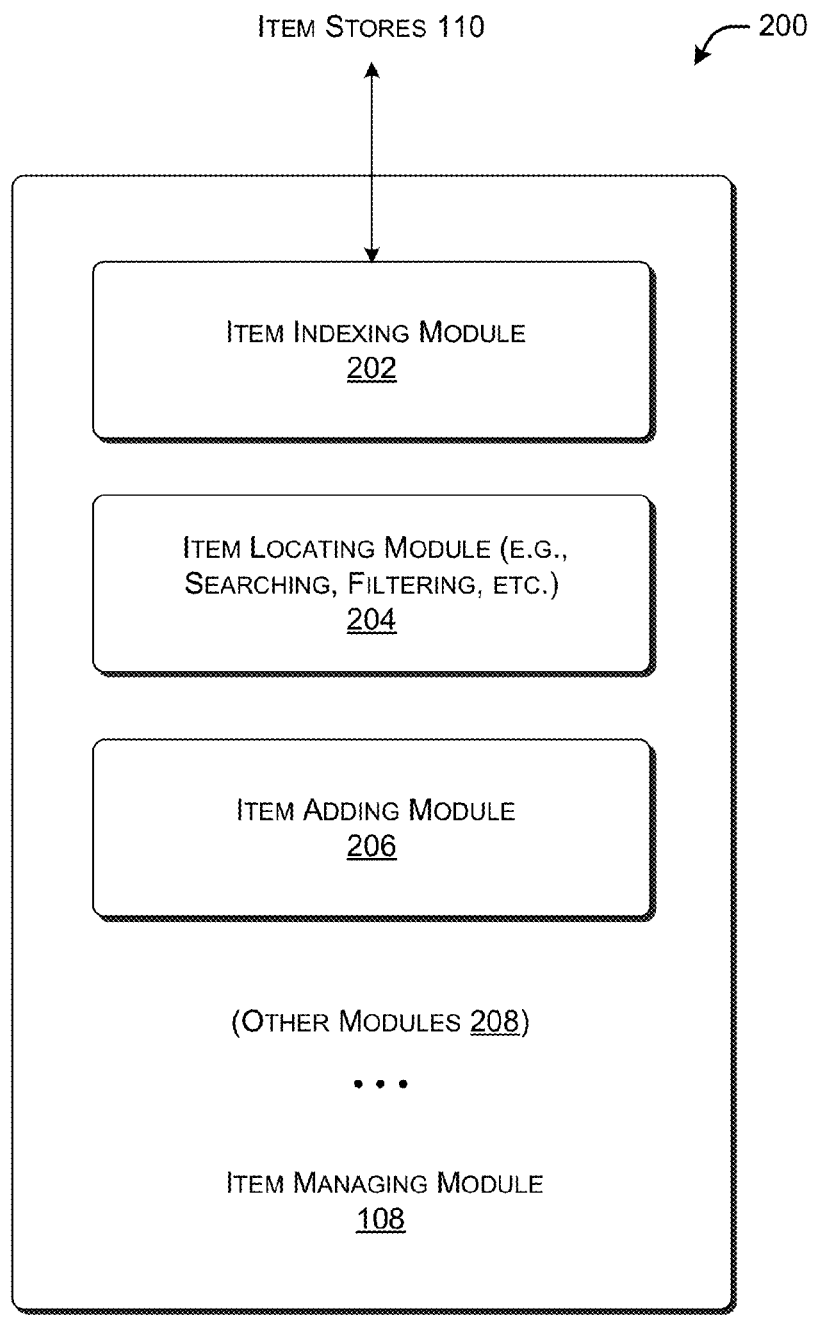
FIG. 2 shows an illustrative item management module for use in the workspace-providing system of FIG. 1; the item management module is used for managing access to items.

Advancing to FIG. 2, this figure provides additional details regarding the item management module 108. As summarized above, the item management module 108 items presents an initial set of items to the user, where the items are potentially selected from the plural data stores 110. The item management module 108 also provides functionality which enables the user to locate desired items within the initial set of items and to add the desired items to a workspace.

The item management module 108 includes (or can be conceptualized to include) multiple modules. An item indexing module 202 performs the task of creating an index of items stored in the plural item stores 110. These items will be identified by the item UI presentation in its initial list of items. The indexing task itself may include multiple components. As a first component, the item indexing module 202 identifies item stores that are likely to contain items that a user may wish to add to a workspace. The item indexing module 202 can apply various application-specific rules to perform this task. In one approach, the item indexing module 202 can be expressly configured, in advance, to index items from particular locations. For example, the user may instruct the item indexing module 202 to index items that are locally stored by the user's device at particular locations (such as items located in particular folders, or items located on the user's device desktop, etc.). The user may also expressly instruct the item indexing module to index items in certain network-accessible stores. Alternatively, or in addition, the user may instruct the item indexing module 202 to index items that the user has chosen to share in the past in the context of any workspace or in particular types of workspaces, regardless of where these items are presently stored.

In addition, or alternatively, the item indexing module 202 can apply any type of dynamic analysis to determine the item stores from which it should index items. For example, the indexing module 202 can determine the characteristics of a particular workspace under consideration and then select the item store(s) 110 which are suitable for that particular workspace. The characteristics of the workspace may be determined based on keywords in the title of the workspace, the identities of the workspace members, the types of items already attached to the workspace, and so on.

In addition, or alternatively, the item indexing module 202 can incorporate a learning engine which determines a user's pattern of behavior in attaching items to workspaces. This yields habit information. The item indexing module 202 can use such habit information to select item stores 110 that the user has accessed in the past when building a workspace, e.g., based on the theory that item stores accessed many times in the past may remain relevant to the user's current workspace-related interests. Still other application-specific rules can be used to identify relevant item stores 110.

As another component of its operation, the item indexing module 202 can select specific items provided in the identified stores 110 for inclusion in the initial set of items presented in the item UI presentation. Again, the item indexing module 202 can rely on various application-specific rules to perform this task. In one approach, the item indexing module 202 can select all items from the identified stores 110. In addition, or alternatively, the item index module 202 can select certain items that match defined criteria. For instance, the item indexing module 202 can select items that include certain keywords in their file names or contents, items that identify certain authors, items that correspond to certain date ranges, and so on. In addition, or alternatively, the item indexing module 202 can select items, in part, based on the prior actions of the user. In other words, as discussed above, the item indexing module 202 can employ a learning engine to make a more intelligent selection of items based on the user's pattern of behavior. Still other application-specific rules can be used to identify relevant items in identified item stores 110.

As another component of its operation, the item indexing module 202 can perform the actual act of generating the list of candidate items to be presented in the item UI presentation. In one case, the item indexing module 202 can assemble a list of reference pointers which point to the identified items. In this case, the items may still be stored in their respective original item stores 110. In another case, the item indexing module 202 can actually copy or move the identified items to a central repository associated with the workspace. In this scenario, the initial set of items in the item UI presentation will then identify the items in the central repository.

An item locating module 204 performs the task of interacting with the user to locate a desired item or items in the initial set of items. In one implementation, the item locating module 204 allows a user to locate items by entering search selections and filtering selections. For instance, upon entry of a search selection, the item locating module 204 will exclude that subset of the initial set of items that do not match the search selection. Upon entry of a filtering selection, the item locating module 204 will further narrow the remaining items to exclude those items that do not match the filtering selection. The item locating module 204 can employ yet other mechanisms for locating items within the initial set of items.

An item adding module 206 performs the task of adding selected items to the workspace. The item adding module 206 can perform this task using different mechanisms. In one approach, the item adding module 206 allows a user to move a desired item from the item UI presentation to the workspace UI presentation using a drag-and-drop procedure. The item adding module 206 interprets this operation as an instruction to add the identified item to the workspace's list of shared items. More specifically, in one case, the item adding module 206 can physically copy or move the identified item from its original store location to a store location associated with the workspace. In another implementation, the item adding module 206 can provide a reference pointer that points to the identified item within the workspace, that is, without creating a separate copy of the item itself. Still other ways of attaching items to a workspace can be used.

FIG. 2 also shows that the item managing module 108 can include other modules 208 for performing other respective functions relating to the management of items.

Figure 3:
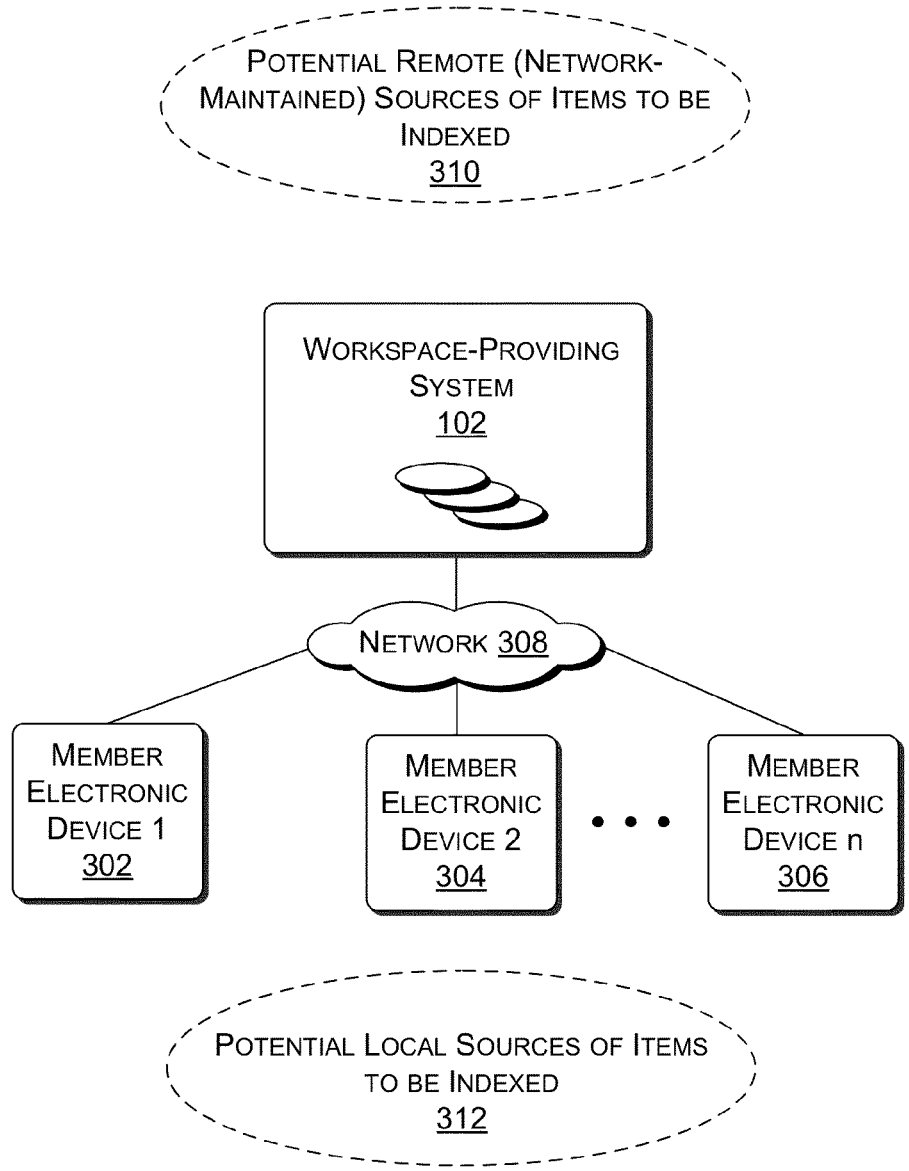
FIG. 3 shows one illustrative network-related implementation of the workspace-providing system of FIG. 1.

Advancing to FIG. 3, this figure shows one illustrative system 300 that can be used to implement the workspace-providing system 102. The system 300 implements the workspace-providing system 102 in a network environment. In the network environment 102, members may access the workspace-providing system 102 using respective member electronic devices (302, 304, . . . 306) via a network 308.

The electronic devices (302, 304, . . . 306) can correspond to any type of data processing device or any combination of types of data processing devices. For instance, an electronic device can be implemented by a desktop computer, a laptop computer, a personal data assistant (PDA) device, a mobile communication device, a set-top box, a game console device, and so on. Or the device can correspond to special-purpose equipment expressly designed for interacting with the workspace-providing system 102. Members may access network-accessible resources using browsing functionality (not shown) provided by the member electronic devices (302, 304, . . . 306).

The network 308 may represent any type of mechanism for allowing the member electronic devices (302, 304, . . . 306) to interact with the workspace-providing system 102. The network 308 can correspond to a wide area network (such as the Internet), a local area network (LAN), a point-to-point connection, or any combination of connectivity mechanisms. The network 308 can be physically implemented using any combination of hardwired links, wireless links, name servers, gateways, routers, and so on (not shown). The network 308 can be governed by any protocol or combination of protocols.

In one scenario, the functionality and information associated with a workspace are provided by the workspace-providing system 102 at some network-accessible location (or locations). This means, for instance, that all of the items associated with a workspace may be stored at some network-accessible location (or locations). Alternatively, or in addition, parts of the workspace functionality and/or workspace information can be implemented locally by the member electronic devices (302, 304, . . . 306). For instance, a workspace may include one or more items that are stored locally on one or more member electronic devices (302, 304, . . . 306). The workspace information provided by the workspace-providing system 102 may provide reference pointers which point to these items, rather than a copy of these items. In another alternative case, part (or all) of the workspace-providing system 102 can be implemented using peer-to-peer (P2P) infrastructure, thus eliminating or reducing the role of a centrally provided workspace-providing system 102. Still other implementations are possible.

FIG. 3 also shows two dashed-line bubbles (310, 312) to indicate the various locations from which the item management module 108 may select items for presentation in the item UI presentation. A first collection of stores 310 are provided at various network-accessible locations. A second collection of stores 312 are provided at various local-accessible locations. In other words, the local stores 312 may correspond to stores provided by the member electronic devices (302, 304, . . . 306).

Advancing now to FIG. 4, this figure shows a workspace UI presentation 402 that can be provided by the workspace management module 104 (although, as stated above, the workspace-providing system 102 may physically provide the workspace UI presentation 402 using a combination of back-end functionality and the interface component 107). The workspace UI presentation 402 serves as a main interface through which authorized members may interact with the workspace. In the discussion below, the person who interacts with the workspace UI presentation 402 is referred to as a user.

The workspace UI presentation 402 includes various component parts. The selection and arrangement of these parts shown in FIG. 4 is representative; other implementations can adopt different selections and arrangements of parts.

A menu part 404 of the workspace IU presentation 402 allows the user to invoke different functions provided by the workspace UI presentation 402. For instance, a "workspace" option allows the user to select a particular workspace with which to interact. A "documents" option allows the user to view items that can be added to the workspace, and to then select and add such items. A "people" option allows the user to view people who may be added to the workspace, and then to select and add such persons. The menu part 404 can include yet additional options.

In the representative case of FIG. 4, the user has selected a workspace related to a graduate student conference. A title part 406 of the workspace UI presentation 402 identifies a title associated with the workspace, namely "Grad school conference." A message part 408 of the workspace UI presentation 402 provides a message to the user. In this case, the message is an introductory message which reads "Welcome Anne. You have no tasks for today." In this representative example, the user, "Anne," is an owner of the workspace, which allows her to perform various administrative functions with respect to the workspace.

A member indicator part 410 of the workspace UI presentation 402 identifies how many members are currently assigned to this workspace (in this case, there are eight members). The user can activate the member indicator part 410, upon which the workspace UI presentation 402 will reveal information that identifies the eight members. An "add file"

part 412 of the workspace UI presentation 402 allows a user, upon activation, to add items to the workspace.

An item presentation part 414 of the workspace defines a space for displaying some of the items associated with the workspace. The item presentation part 414 may represent each item using a graphical icon in combination with the item's file name. This is merely an example. For instance, alternatively, or in addition, the item presentation part 414 can identify each item by only listing the file name of the item. The user can activate an item by clicking on the item (or activating it in some other way). The user can then view the item and edit the item (if the user has editing rights). In the example of FIG. 4, all of the items correspond to document items that pertain to the workspace theme, that is, the graduate school conference.

A side panel part 416 provides different functions associated with different tabs. FIG. 4 shows three representative tabs in the side panel part 416: an activity tab; a discussion tab; and a clipboard tab. The tabs activate associated panels for performing associated functions. Other implementations may include additional tabs, fewer tabs, and/or different types of tabs. The user can remove and restore the side panel part 416 by activating an appropriate command, such as a "hide panel" command and a "restore panel" command, respectively.

The activity tab activates an activity panel (which corresponds to the panel that is activated in illustration of FIG. 4). The activity management module 118 can implement the activity panel. The activity panel provides information regarding various tasks that are assigned to the user in connection with the workspace. The activity panel also provides functionality that allows the user to assign new tasks and schedule events. The activity panel may also provide information regarding various notifications generated by the activity management module 118.

The discussion tab activates a discussion panel (not shown in FIG. 4). The discussion management module 120 can implement the discussion panel. The discussion panel provides discussion items (less formally, "messages") pertaining to the workspace. In this case, the discussion items forms a thread of discussion items exchanged among members of the workspace. In one case, the discussion panel can organize the discussion items in a blog-type format, that is, with indentations illustrating the sequence of discussion items in the exchange. The discussion panel may include one or more prompts which enable the user to contribute to the discussion thread, e.g., by replying to an existing discussion item, starting a new discussion thread, and so on. The discussion items in the discussion thread constitute particular types of workspace items, as broadly defined herein.

The clipboard tab activates a clipboard panel (not shown in FIG. 4). The clipboard panel identifies items that have been stored in the user's clipboard. The user may add any of the items in the clipboard to the workspace, e.g., by moving the items from the clipboard panel to the item presentation part 414 using a drag-and-drop operation or other technique.

With this introduction, next assume that the user activates the "documents" option 418 in the menu part 404. This prompts the item management module 108 to present an initial set of items that are potentially selected from the multiple data stores 110 shown in FIG. 1.

Figure 5:
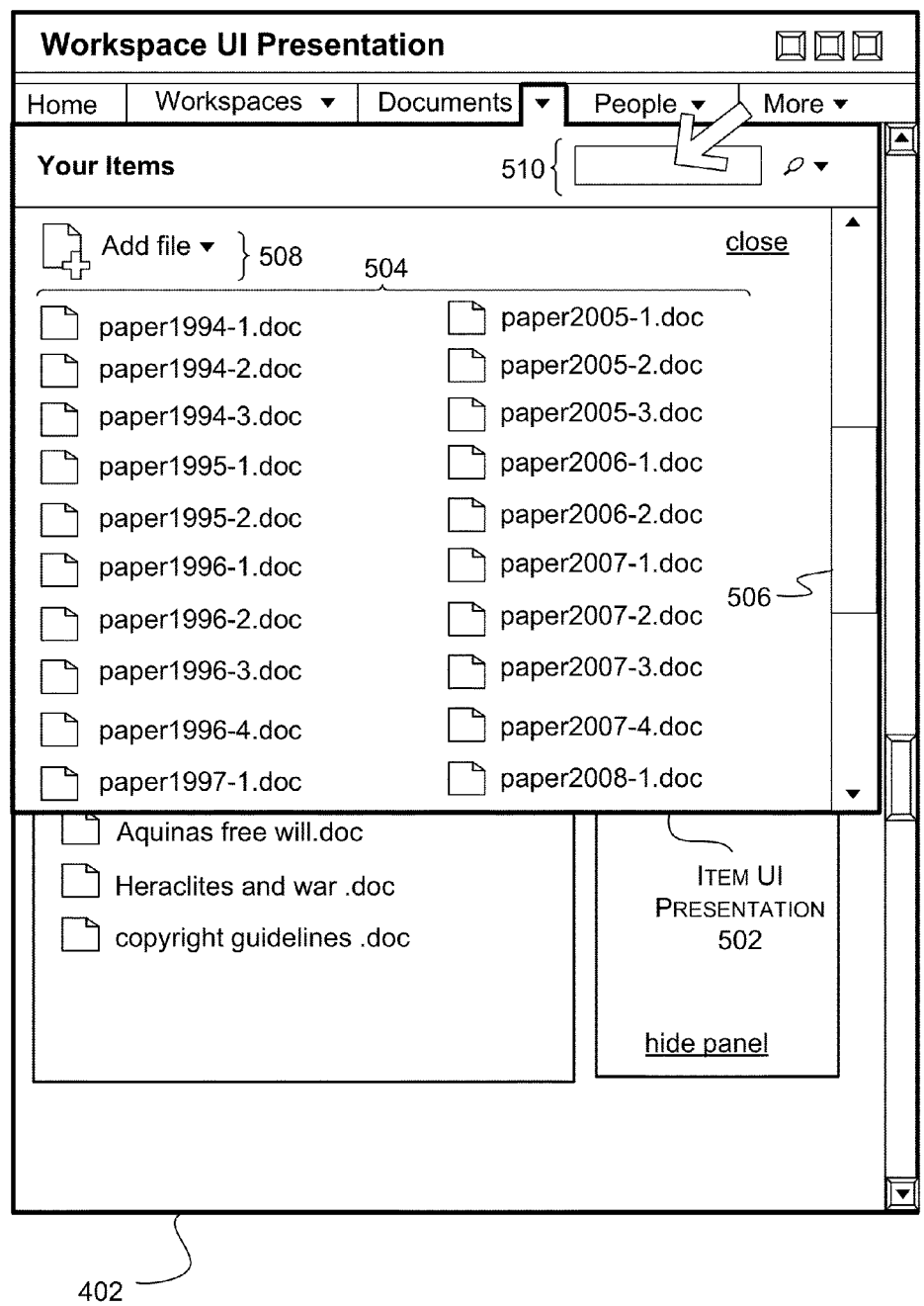
FIG. 5 shows an illustrative item user interface presentation providing by the item management module of FIG. 2, the item user interface presentation showing an initial set of items (e.g., document items).

More specifically, FIG. 5 shows an item UI presentation 502 that is invoked when the user activates the "documents" option 418. First, note that the item UI presentation is displayed inline with respect to the main workspace UI presentation 402. This means that the item UI presentation 502 can be displayed without losing the context of the workspace UI presentation 402. This, in turn, means that the user is less likely to lose focus on his or her task at hand in interacting with the workspace UI presentation 402.

The item UI presentation 502 itself includes multiple parts. An item list part 504 provides identifying information regarding items that have been selected from the plural item stores 110. For instance, the item list part 504 can identify each item by providing any one or more of an icon associated with the item, a file name associated with the item, and so on. A scroll bar 506 allows the user to navigate through the list of items in the event that the complete list is too large to fit within a single panel associated with the item list part 504. An item add part 508 invokes a procedure whereby the user can add any item to the workspace.

A search part 510 allows a user to enter a search selection. The search selection can include one or more keywords or phrases. The user may enter such a search selection because the user cannot readily find a desired item (or items) within the item list part 504. That is, the user may enter the search selection in an attempt to narrow down the choices identified in the item list part 504.

Figure 6:
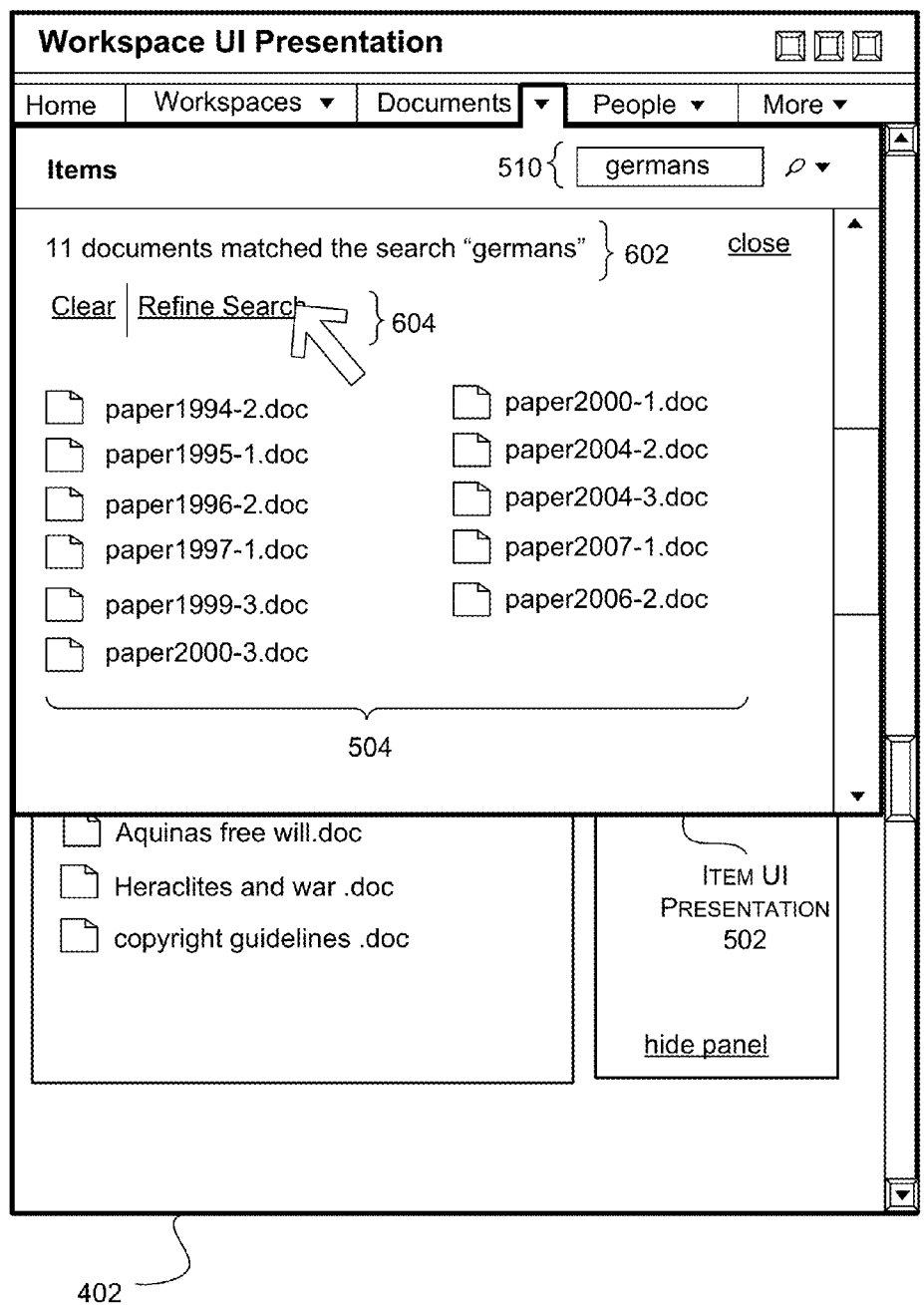
FIG. 6 shows the illustrative user interface presentation of FIG. 5 after the user's entry of a search selection.

More specifically, advancing to FIG. 6, assume that the user enters the search selection "germans" in the search part 510. This causes the item management module 108 to exclude the items in the initial set of items (shown in FIG. 5) which do not match this search selection. The search operation can proceed in different ways, depending on how the search engine is set up. For instance, assume that the items are associated with respective files. The search operation can proceed by matching the search selection with file name information, file metadata information, file content information, and so on, or any combination thereof. FIG. 6 shows the results of this operation in the modified item list part 504. The items identified therein have been narrowed to exclude all the items in the initial set of items which do not match the search selection "germans." A search result message 602 informs the user that eleven document items matched her search.

As this stage, the user may be able to pick out the document item that matches her interests. If not, the item UI presentation 502 provides a "refine search" part 604 that invites the user to enter further narrowing criteria. Alternatively, the user may change the search selection in the search part 510. Alternatively, the user may activate a "clear" command to return to the initial set of items.

Figure 7:
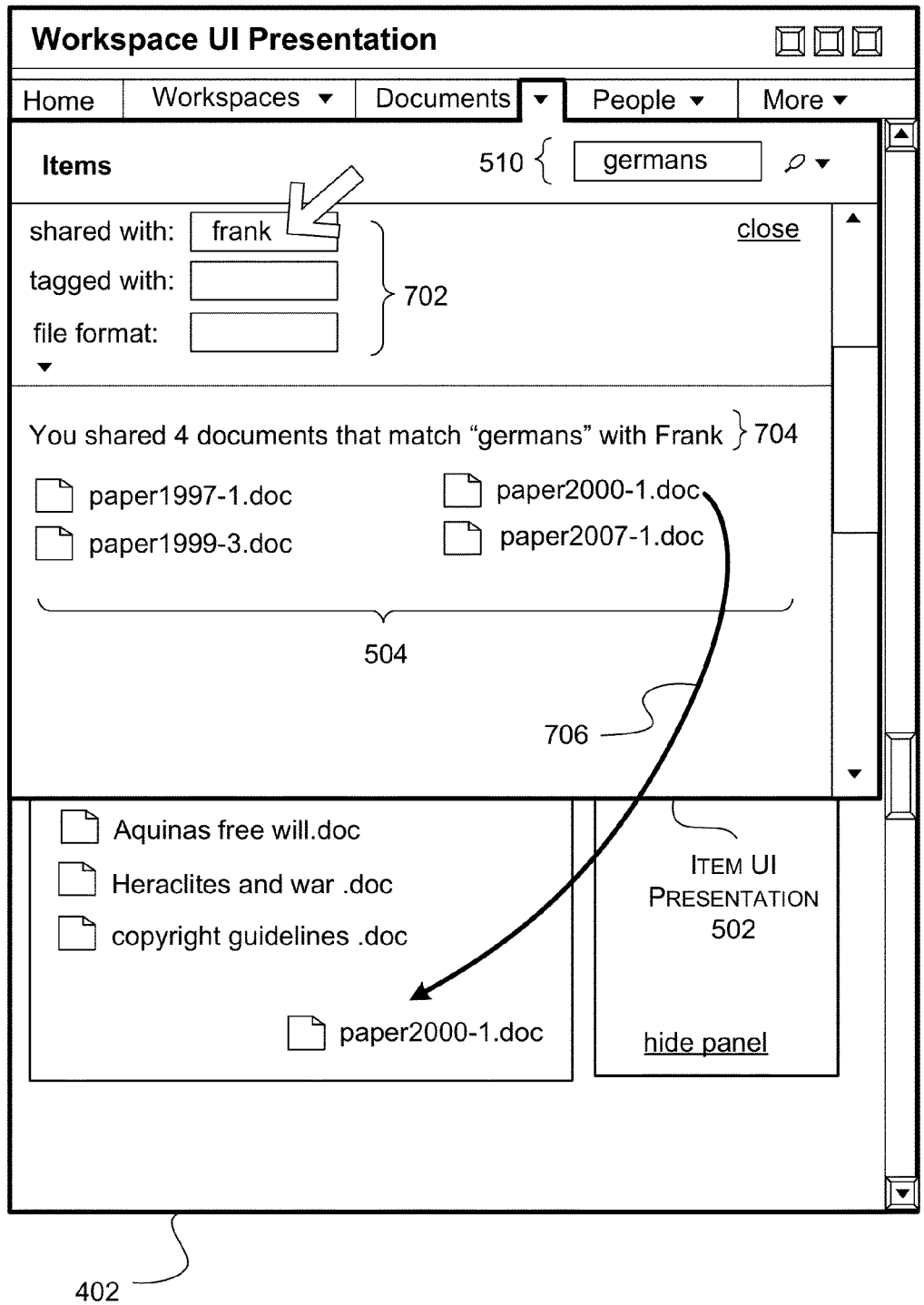
FIG. 7 shows the illustrative user interface presentation of FIG. 6 after the user's entry of a filtering selection; the user then drags a desired item from the item user interface presentation into the workplace user interface presentation.

Assuming that the user activates the "refine search" part 604, the flow advances to FIG. 7. Here, the item management module 108 presents a filter part 702. The filter part 702 allows the user to enter various types of filtering selection with the intent of further narrowing the items presented in the item list part 504. In this case, the filter part 702 invites the user to input a "shared with" filtering type selection (to indicate the people with whom the item of interest is shared), a "tagged with" filtering type selection (to indicate the information with which the item of interest is tagged), a "file format" type of filtering selection (to indicate the format that is used by the item of interest), and so on. This list of filtering selection is merely representative. Other implementations may use additional types of filtering selections, different types of filtering selections, and so on.

Assume in the merely representative case of FIG. 7 that the user enters the filtering selection "frank" to restrict the list of candidate items to those which are shared with the individual "frank." As a result, the item management module 108 presents a further refined list of candidate items in the item list part 504 (as shown in the modified list of FIG. 7). In particular, a message 704 informs the user that there are now only four document items that match the combination of the user's selections, namely a first search selection of "germans" and a second "shared with" filtering selection of "frank."

At this point, assume that the user identifies an item of interest. The user may then proceed by adding the item to the workspace. The item management module 108 can provide different mechanisms for accomplishing this task. According to one approach (denoted by arrow 706), the user can drag the identified item from the item UI presentation 502 to the main workspace UI presentation 402. The item now becomes a part of the workspace. Workspace members can interact with this item in shared manner in accordance with their assigned permissions.

Note that, throughout the entire process of adding an item to the workspace, the context of the main workspace UI presentation 402 was not lost. Again, this is potentially useful because it allows the user to maintain focus while interacting with a workspace.

The procedure for adding an item was described above with respect to a specific sequence of item-locating operations. Namely, the user entered a search selection first, followed by a filtering selection. This is merely a representative example. In other cases, the item management module 108 can allow the user to enter different types of selections in any type of sequence. For example, the user can enter a filtering selection first, followed by a search selection, and so on.

Further, the procedure for adding items was described above in the illustrative context of actions performed on document items. The same principles can be applied to locate other types of items. For example, FIGS. 8-11 show another series of UI presentations in which the user applies the principles described above to locate one or more desired contact items (e.g., people). Upon finding a desired contact item, the user can then add the associated person as a new member of the workspace. Or the user can perform some other action with respect to that person.

Figure 8:
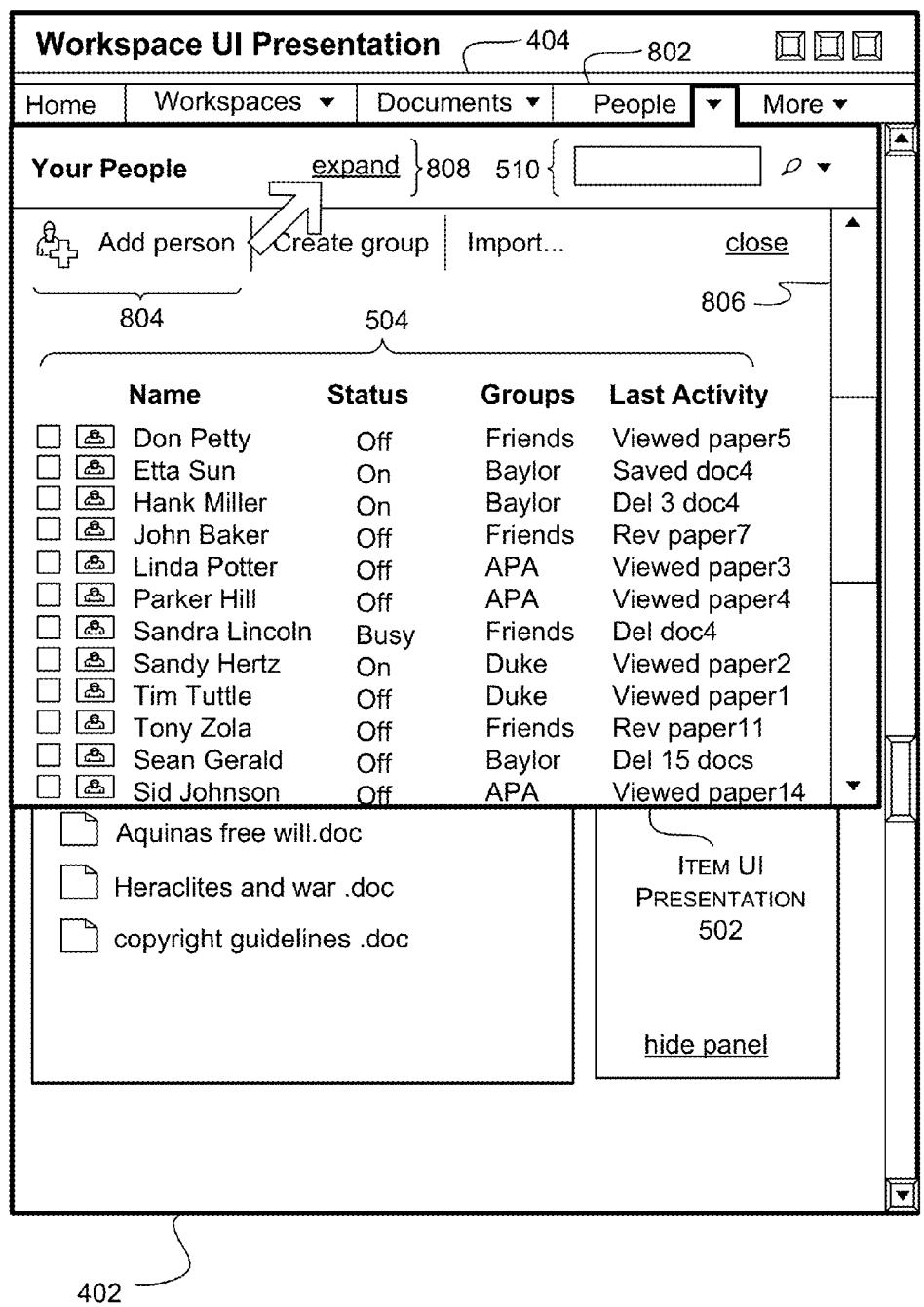
FIG. 8 shows an illustrative item user interface presentation for presenting an initial set of contact items associated with people.

More specifically, starting with FIG. 8, assume that the user begins the search by activating the "people" option 802 within the menu part 404. This prompts the item management module 108 to provide a list of the user's contact items from potentially across multiple item stores 110. The item management module 108 presents an initial list of such contact items in the item UI presentation 502. In this case, the items shown in the item list part 504 correspond to a list of people. More specifically, the item list part 504 presents the name associated with each contact item, together with other fields of information regarding the contact item. Namely, a "Status" field indicates whether the identified person is currently online with respect to a messaging service. A "Groups" field indicates one or more groups to which the identified person belongs. And a "Last Activity" field identifies the last activity performed by the identified person, and so on. Other implementations can provide different fields.

Assume that the user identifies a person that she would like to add to the workspace. To perform this function, the user may activate an "ad person" part 804. This prompts the permissions management module 106 to grant permission rights to the selected person in the list of contact items. The user may also define the permission level associated with the selected person.

Alternatively, assume that the user does not readily notice a person that she is seeking. The user may respond by activating a scroll bar 806 to view additional parts of the complete list of contact items. If the user still does not notice the desired person, the user may enter one or more search selections in the search part 510. Instead, assume that the user, at this juncture, activates an "expand" command 808. This action prompts the item management module 108 to reformat the list of contact items in the item list part 504 into the format shown in FIG. 9.

Figure 9:
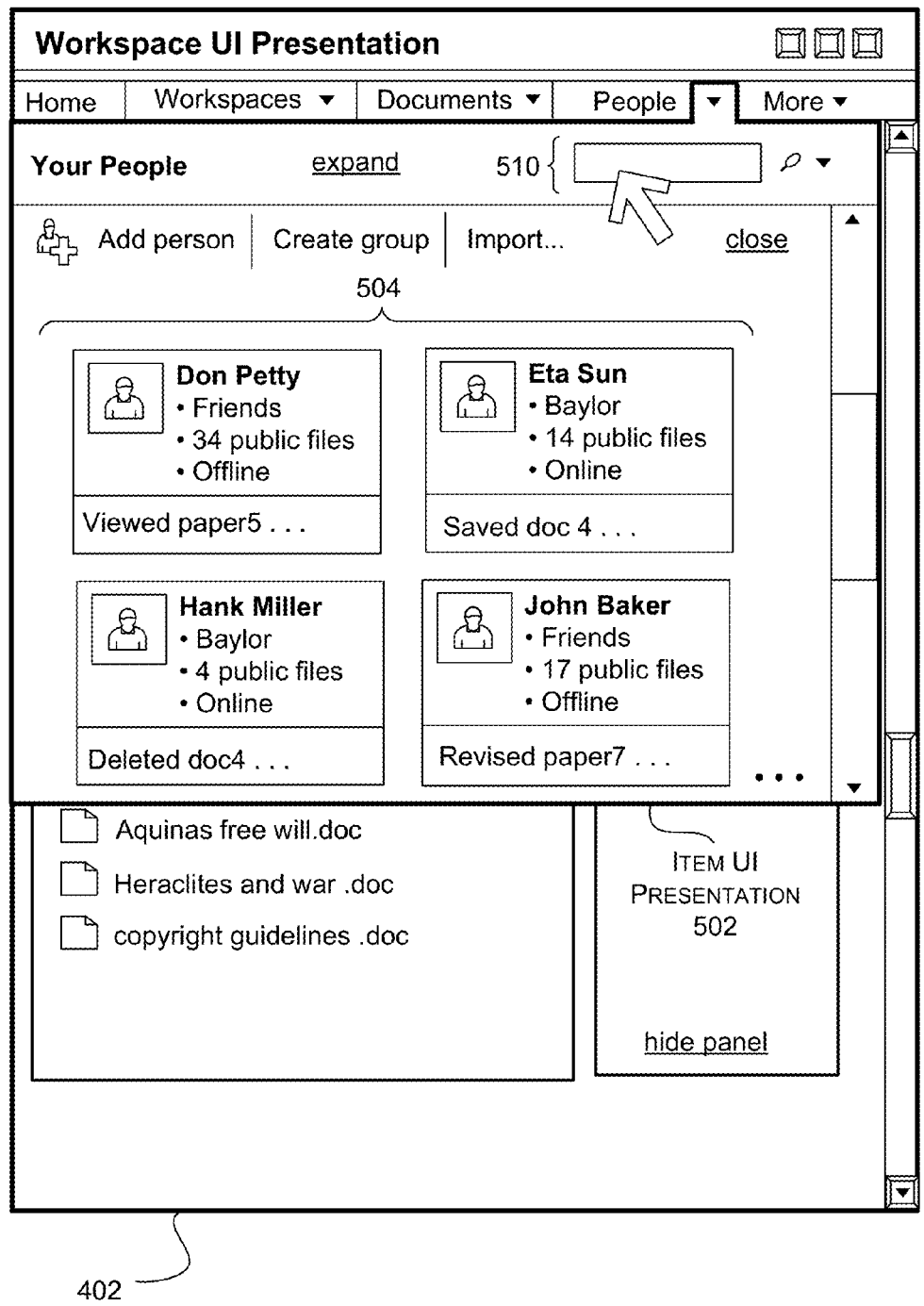
FIG. 9 shows a different illustrative view of the item user interface presentation of FIG. 8.

Advancing to FIG. 9, the item management module 108 now displays the list of contact items in an expanded panel form. Each panel presents additional information regarding an associated person. The expanded information, for example, may include an enlarged version of a personalized icon associated with a person.

Figure 10:
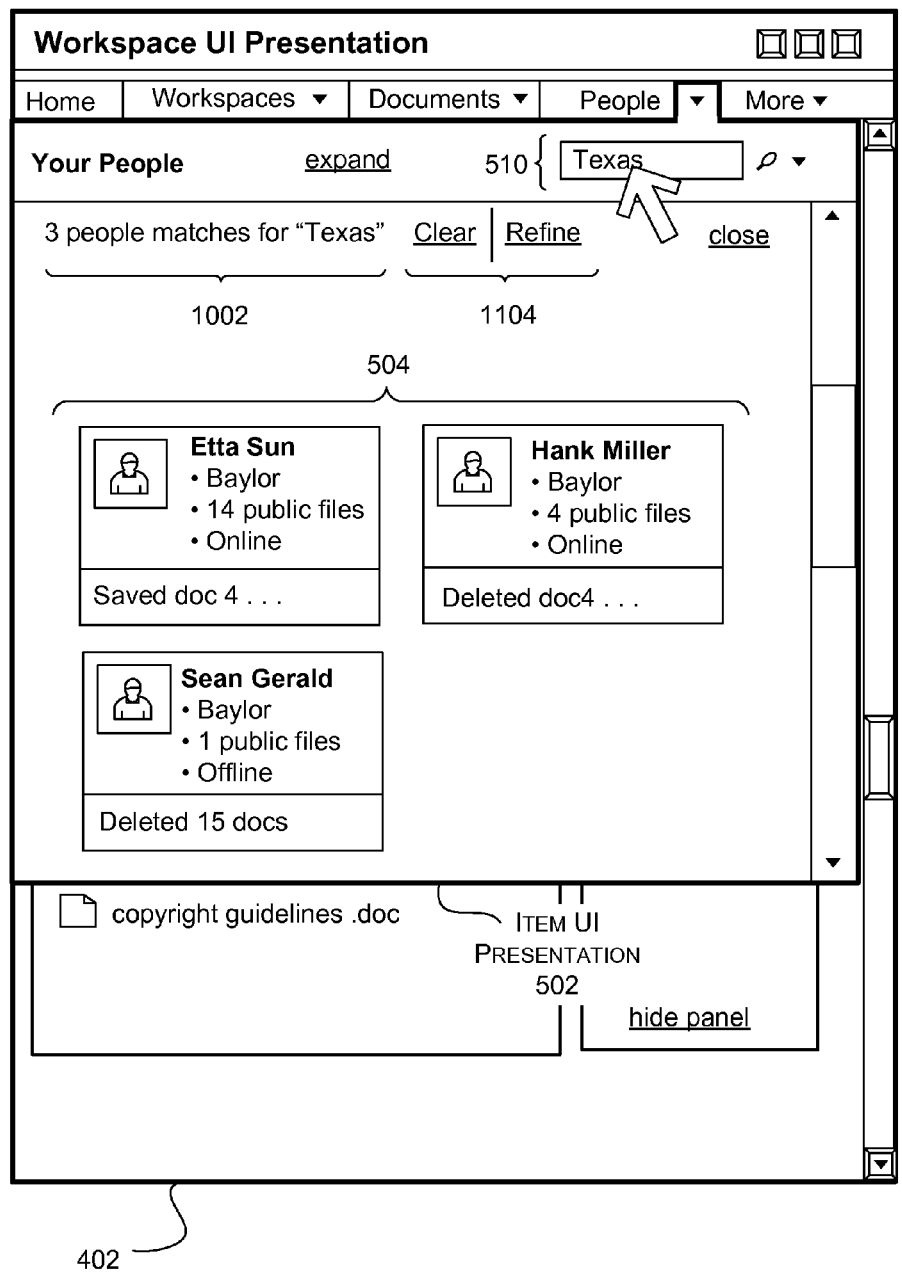
FIG. 10 shows the illustrative item user interface presentation of FIG. 9 after the user's entry of a search selection.

Advancing to FIG. 10, assume, at this juncture, that the user decides to enter a search term in the search part 510. In this case, the user enters the search term "Texas." The item management module 108 responds by presenting a modified list of contact items that exclude contact items in the initial set of items that do not match the search term "Texas." Matching can be performed in various ways, as described above, such as by matching search selections with file name information, file metadata information, file content information, and so on, or any combination thereof. The item list part 504 shown in FIG. 10 displays the modified list of contact items that results from the search operation. The message 1002 informs the user that three contact items match the user's search term.

The user can enter additional selections to further narrow the list of matching items. For example, the user can activate a "refine search" command 1104 to enter one or more filtering selections (in the manner explained above with respect to FIG. 7).

But since there are only three matches, assume, at this point, that the user is ready to take action with respect to the remaining contact items. As stated above, one action the user can take is to add one of the remaining contact items to the workspace. This can be performed, in one example, by using a drag-and-drop procedure to move a contact item from the item UI presentation 502 to the workspace. In particular, the user can drag a contact item from the item UI presentation 502 into a permissions UI interface presentation (not shown) which groups the existing workspace members into different permission-level categories (e.g., owner, editor, viewer, etc.). That is, the user can drop the contact item in the desired permission-level category to assign an appropriate permission level to the person associated with the contact item.

Figure 11:
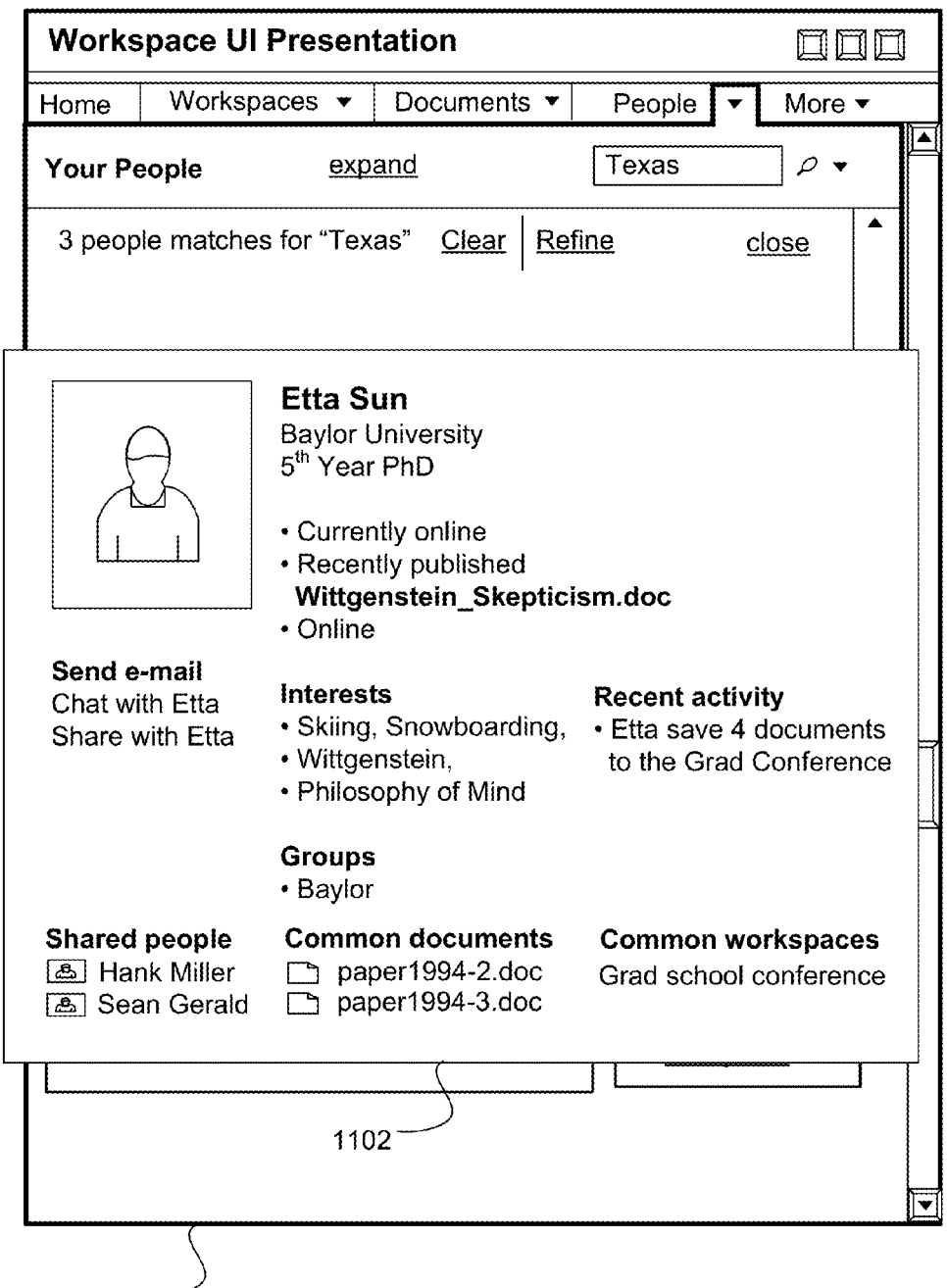
FIG. 11 shows additional information that can be presented upon the user's activation of any contact item shown in FIG. 10.

Instead of the above operation, assume that the user simply wishes to discover more information regarding one of the contact items shown in FIG. 10. To discover such additional information, the user may proceed by activating a desired contact item (e.g., by clicking on the contact item). As shown in FIG. 11, this action results in the presentation of a panel 1102 which presents additional information regarding the selected person, in this case the person named "Etta Sun."

As in the case of the above-described document-related scenario, note that the contact-related item UI presentations 502 are displayed inline with respect to the core workspace experience associated with the workspace UI presentation 402. Again, this helps the user maintain her focus on the workspace tasks at hand, and also reduces the complexity of item management tasks.

B. Illustrative Flowcharts

Figure 12:
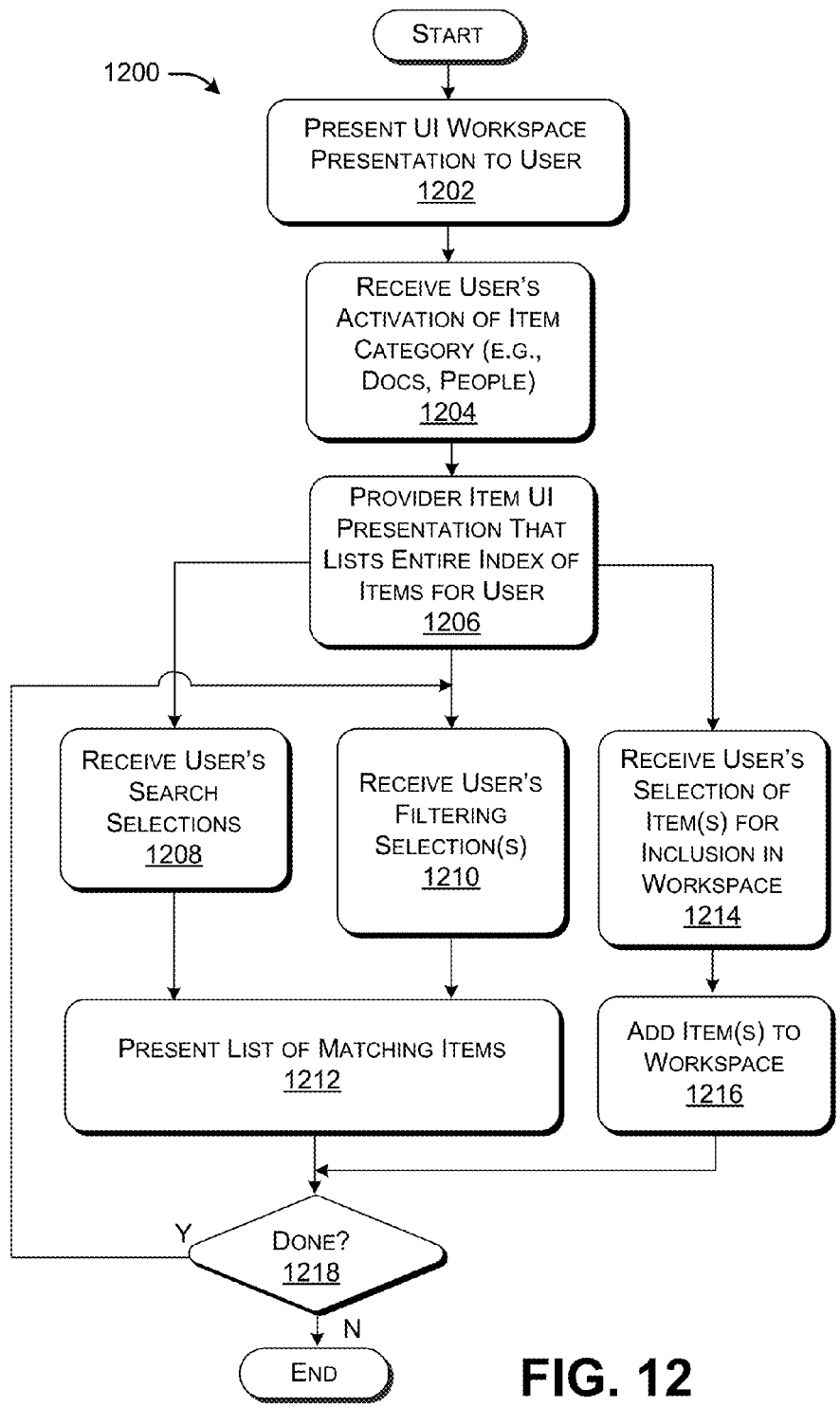
FIG. 12 is a flowchart that shows an illustrative general procedure for presenting an item user interface presentation and then taking an action within respect to the item user interface presentation.
Figure 13:
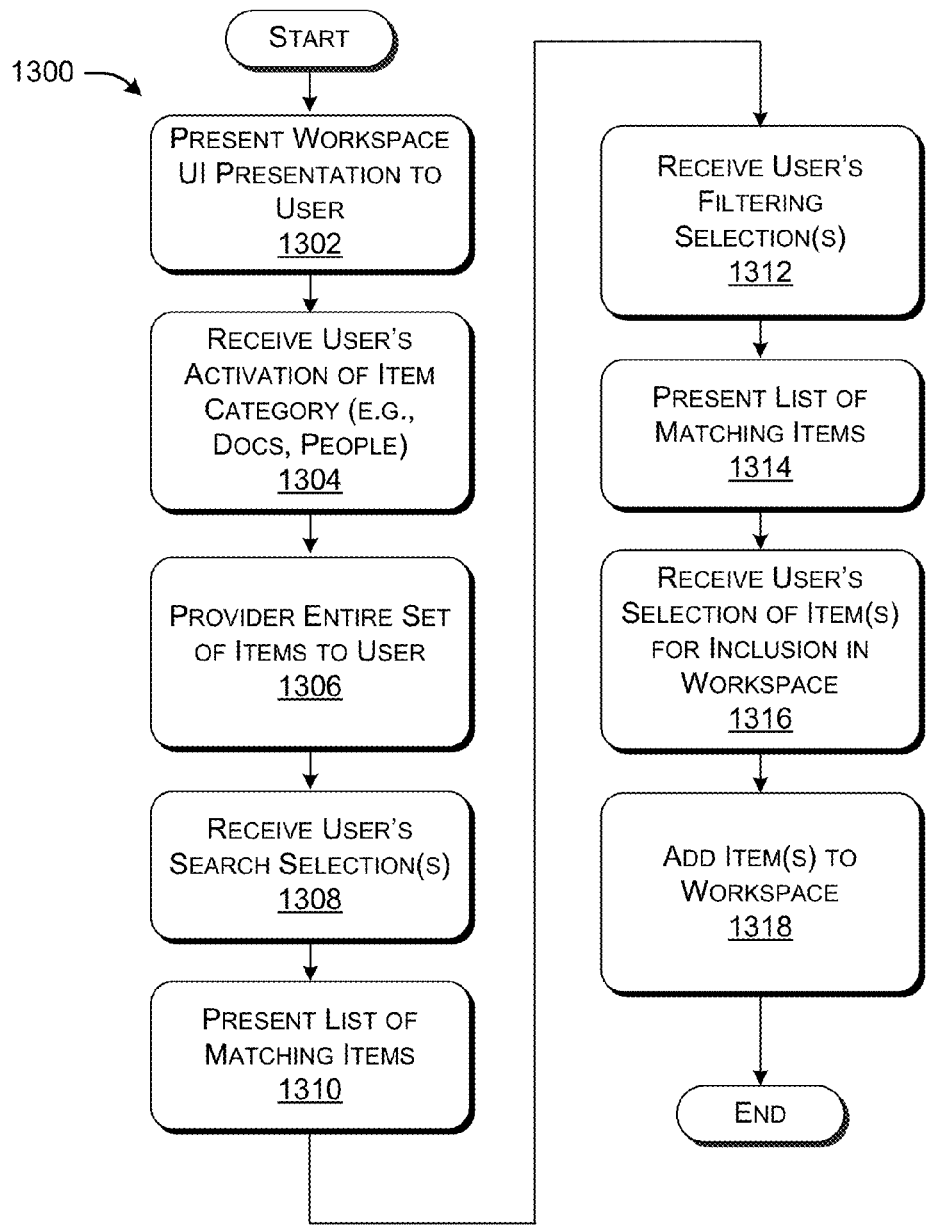
FIG. 13 is a flowchart that shows one illustrative application of the general procedure of FIG. 12.

FIGS. 12 and 13 illustrate the operation of the workspace-providing system 102 in flowchart form. To facilitate discussion, certain operations are described in FIGS. 12 and 13 as constituting distinct blocks performed in a certain order. Such implementations are illustrative and non-limiting. Certain blocks described herein can be grouped together and performed in a single operation, and certain blocks can be performed in an order that differs from the order employed in the examples set forth in this disclosure. The blocks shown in the flowcharts can be implemented by software, firmware, hardware, manual processing, any combination of these implementations, and so on.

As the functions described in the flowcharts have already been set forth above, the following explanation will serve as a summary and review of those functions.

Starting with FIG. 12, this figure shows a general procedure 1200 for accessing items and adding items to a workspace. The procedure 1200 is described from the general vantage point of being executed by the workspace-providing system 102.

In block 1202, the workspace-providing system 102 presents a workspace UI presentation 402 to the user through which the user can interact with a workspace.

In block 1204, the workspace-providing system 102 receives the user's selection of an appropriate item management category, e.g., a "documents" option 418 as selected in FIG. 4 or a "people" option 802 as selected in FIG. 8, and so on.

In block 1206, the workspace-providing system 102 (and, in particular, the item management module 108) responds by presenting an item UI presentation 502 that presents an initial list of items that is potentially culled from multiple stores 110.

The user may proceed at this point by taking different possible actions. In block 1208, assume that the user has entered a search selection (e.g., in search part 510 of FIG. 5). Block 1208 entails accepting the entered search selection. Or, in block 1210, assume that the user has entered a filtering selection (e.g., in filter part 702 of FIG. 7). Block 1210 entails accepting the entered filtering selection. In block 1212, the workspace-providing system 102 responds to these types of selections by providing a modified list of items within the item UI presentation 502.

Alternatively, in block 1214, assume that the user has made a decision to add one or more items to the workspace. Block 1214 entails receiving the user's instruction to add an item to the workspace, while block 1216 entails carrying out the instruction by adding the item to the workspace. Together, blocks 1214 and 1216 can be implemented using a drag-and-drop procedure whereby an item in the item UI presentation 502 is moved to a relevant destination UI presentation, such as the workspace UI presentation 402.

Finally, block 1218 indicates that any of the above operations can be repeated in any order. For example, the user may decide to enter a search selection followed by a filtering selection, and so on.

FIG. 13 shows a procedure 1300 that represents one specific sequence of operations which conforms to the general principles set forth in FIG. 12. The flow in procedure 1300 also corresponds sequence of operations shown in UI form in FIGS. 4-7.

In block 1302, the workspace-providing system 102 presents the workspace UI presentation 402 to the user.

In block 1304, the workspace-providing system 102 receives the user's selection of a desired item management category, e.g., "documents," "people," etc.

In block 1306, the workspace-providing system 102 provides an initial set of items in the item UI presentation 502.

In block 1308, the workspace-providing system 102 receives the user's search selection.

In block 1310, the workspace-providing system 102 presents a first modified list of items which matches the user's search selection.

In block 1312, the workspace-providing system 102 receives the filtering selection made by the user.

In block 1314, the workspace-providing system 102 presents a second modified list of items which match both the user's search selection and the user's filtering selection.

In block 1316, the workspace-providing system 102 receives the user's instruction to add a selected item to the workspace. In block 1318, the workspace-providing system 102 performs the actual act of adding the selected item to the workspace. As mentioned above, in one example, blocks 1316 and 1318 can be implemented using a drag-and-drop procedure.

C. Representative Processing Functionality

FIG. 14 sets forth illustrative electrical data processing functionality or equipment 1400 (simply "processing functionality" below) that can be used to implement any aspect of the functions described above. With reference to FIG. 1, for instance, the processing functionality 1400 can be used to implement the workspace-providing system 102 or any component thereof. With reference to FIG. 3, the processing functionality 1400 can also (or alternatively) be used to implement any of the user electronic devices (302, 304, . . . 306). The processing functionality 1400 may correspond to a general purpose computing device, a special purpose computing device, or any other implementation.

The processing functionality 1400 can include volatile and non-volatile memory, such as RAM 1402 and ROM 1404, as well as one or more processing devices 1406. The processing functionality 1400 also optionally includes various media devices 1408, such as a hard disk module, an optical disk module, and so forth. The processing functionality 1400 can perform various operations identified above when the processing device(s) 1406 executes instructions that are maintained by memory (e.g., RAM 1402, ROM 1404, or elsewhere). More generally, instructions and other information can be stored on any computer-readable medium 1410, including, but not limited to, static memory storage devices, magnetic storage devices, optical storage devices, and so on. The term "computer-readable medium" also encompasses plural storage devices. The term "computer-readable medium" also encompasses signals transmitted from a first location to a second location, e.g., via wire, cable, wireless transmission, etc. The term "logic" describes instructions for performing identified tasks; for example, item management logic corresponds to instructions associated with the tasks performed by the item management module 108 as described above.

The processing functionality 1400 also includes an input/output module 1412 for receiving various inputs from a user (via input modules 1414), and for providing various outputs to the user (via output modules). One particular output mechanism may include a presentation module 1416 and an associated graphical user interface (GUI) 1418. The processing functionality 1400 can also include one or more network interfaces 1420 for exchanging data with other devices via one or more communication conduits 1422. One or more communication buses 1424 communicatively couple the above-described components together.

In closing, the description may have described various concepts in the context of illustrative challenges or problems. This manner of explication does not constitute an admission that others have appreciated and/or articulated the challenges or problems in the manner specified herein.

More generally, although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method executed at least in part in a computing device for managing item access in a network environment, the method comprising:
   providing an interactive user interface through a display for enabling one or more users to collaborate on one or more items associated with a collaborative workspace, wherein the collaborative workspace defines a linked collection of one or more of: members, permissions, items, activities, notifications, and messages and wherein items include one or more of: word processing document items, spreadsheet document items, presentation-related document items, data items, discussion items;
   displaying on the display a menu part on the interactive user interface presenting a plurality of functions available for managing the collaborative workspace;
   displaying on the display a list of users associated with the collaborative workspace on the interactive user interface;
   displaying on the display the one or more items associated with the collaborative workspace in an item presentation part of the interactive user interface, wherein the workspace stores the items as one or more of: an actual copy included in the workspace and a virtual copy with a reference pointer pointing to where the items are stored;
   enabling a user with administrative rights to add and remove items from the collaborative workspace utilizing a workspace management module wherein addition of an item to the collaborative workspace places the item in a shared location;
   displaying on the display tasks associated with the collaborative workspace on an activity panel implemented by an activity management module on the interactive user interface for enabling the user with administrative rights to set up tasks for one or more users associated with the collaborative workspace;
   displaying on the display a message thread in a discussion management module on the interactive user interface for enabling the one or more users associated with the collaborative workspace to exchange messages; and
   upon detection of an instruction through an input device from the user with administrative rights to manage the one or more items associated with the collaborative workspace, providing an item user interface in a separate window overlapping with the interactive user interface on the display enabling the user with administrative rights to view one or more candidate items for associating with the collaborative workspace without losing a context associated with the collaborative workspace.

2. The method of claim 1, further comprising:
   displaying on the display a documents option on the menu part of the interactive user interface for allowing the user to view items that can be added to the collaborative workspace;
   enabling the user through an input device to select the documents option for executing the instruction to manage items associated with the collaborative workspace;
   upon detection of the selection of the documents option, identifying at least one data store storing one or more candidate items relevant to the collaborative workspace;
   selecting one or more candidate items from the at least one data store for presenting in the item user interface;
   presenting the selected candidate items from the data store in a list of candidate items in the item user interface on the display;
   enabling the user to select one or more of the candidate items from the list of candidate items for associating with the collaborative workspace; and
   adding the one or more selected candidate items from the list of candidate items to the item presentation part of the interactive user interface.

3. The method of claim 2, wherein identifying at least one data store storing one or more candidate items relevant to the collaborative workspace further comprises one or more of: identifying at least one local data store storing one or more candidate items, identifying at least one external network-accessible data store storing one or more candidate items; and identifying at least one candidate item previously associated by the user with one or more other collaborative workspaces in any data store regardless of where located.

4. The method of claim 2, further comprising:
   presenting an add file option on the item user interface on the display; and
   enabling the user to add one or more of the candidate items to the item presentation part of the interactive user interface by selecting one or more of the candidate items and selecting the add file option.

5. The method of claim 4, further comprising:
   displaying a selection option for the user to select one or more of the candidate items from the list of candidate items presented in the item user interface and to perform a drag-and-drop operation to move the selected item into the item presentation part of the interactive user interface for adding the selected item to the item presentation part of collaborative workspace.

6. The method of claim 2, further comprising:
   providing a search selection option and a filtering selection option for the user to narrow the list of candidate items presented in the item user interface based on user defined criteria.

7. The method of claim 6, wherein the search selection further comprises:
   displaying on the display a search part on the item user interface;
   enabling the user to enter a search term in the search part; and
   presenting a modified list of candidate items in the item user interface that excludes one or more items that do not satisfy the search term.

8. The method of claim 6, wherein the filtering selection further comprises:
   displaying on the display a filter part on the item user interface;
   enabling the user to enter filtering criteria in the filter part; and
   presenting a modified list of candidate items in the item user interface that excludes one or more items that do not satisfy the filtering criteria.

9. The method of claim 2, wherein presenting the list candidate items in the item user interface further comprises:
   creating a reference pointer to point to one or more candidate items where they are stored in the data store.

10. The method of claim 2, wherein presenting the list candidate items in the item user interface further comprises:
    making a copy of the one or more candidate items; and
    storing the copy of the one or more candidate items in a central repository location associated with the collaborative workspace.

11. A computing device for managing item access in a network environment, comprising:
a memory storing instructions;
a processor coupled to the memory, the processor configured to execute:
a workspace management module configured to:
manage set-up and operation of a collaborative workspace; and
employ an interface component to provide an interactive user interface for enabling one or more users to collaborate on one or more items associated with the collaborative workspace within a context of the network environment, wherein the administrative rights with respect to the workspace include one or more of: set up, manage, and terminate the collaborative workspace;
a presentation module coupled to the workspace management module, the presentation module configured to:
display a menu part providing a plurality of available functions for interacting with the collaborative workspace provided by the interactive user interface;
display a list of users associated with the collaborative workspace on the interactive user interface;
display the one or more items associated with the collaborative workspace in an item presentation part of the interactive user interface; and
an item management module configured to:
enable the user with administrative rights to add and remove items from the collaborative workspace, wherein addition of an item to the collaborative workspace places the item in a shared location to be accessed and acted upon by members of the workspace in a manner defined by respective permissions of the members;
display a documents option on the menu part of the interactive user interface for allowing the user to view items that can be added to the collaborative workspace;
enable the user to select the documents option for executing the instruction to manage items associated with the collaborative workspace;
upon detection of an instruction from a user to manage items associated with the collaborative workspace, provide an item user interface in a separate window overlapping with the interactive user interface enabling the user to view one or more candidate items for associating with the collaborative workspace without losing a context associated with the collaborative workspace; and
an activity management module configured to:
enable the user with administrative rights to set up and assign one or more tasks to the one or more users associated with the collaborative workspace;
display the one or more tasks assigned to the one or more users in an activity panel associated with the collaborative workspace; and
provide notifications and alerts regarding the status of the one or more tasks to the one or more users associated with the collaborative workspace;
an item indexing module coupled to the item management module, the item indexing module configured to:
apply a dynamic analysis to determine one or more observed characteristics of the collaborative workspace and to select an item store from which to index the items suitable for the collaborative workspace based on the observed characteristics; and
enable the user with administrative rights to instruct the item indexing module to index items that the user has chosen to share in the past in a context of any workspace and in particular types of workspaces, regardless of where the items are presently stores; and
a discussion management module configured to display a message thread for enabling the one or more users associated with the collaborative workspace to exchange messages, reply to an existing message, and start a new message thread.

12. The computing device of claim 11, wherein the item indexing module is further configured to:
identify at least one data store storing the one or more candidate items associated with the collaborative workspace;
select one or more candidate items from the data store for presenting in the item user interface; and
present the selected candidate items from the data store in a list of candidate items in the item user interface;
an item locating module coupled to the item management module, the item locating module configured to enable the user to select one or more of the candidate items from the list of candidate items for associating with the collaborative workspace; and
an item adding module coupled to the item management module, the item adding module configured to enable the user to add the one or more selected candidate items from the list of candidate items to the item presentation part of the interactive user interface.

13. The computing device of claim 12, wherein the observed characteristics include one or more of: a keyword in a title of the workspace, a keyword in one or more items associated with the collaborative workspace, identities of the one or more users associated with the collaborative workspace, and the types of items already attached to the collaborative workspace.

14. The computing device of claim 13, wherein the item indexing module is further configured to select one or more candidate items from the data store for presenting in the item user interface based on user defined criteria, wherein the user defined criteria includes one or more of: keywords in a file name and contents of the one or more candidate items, an author of the one or more candidate items, a date range for the one or more items, and a type of item.

15. The computing device of claim 14, wherein the item indexing module is further configured to select the data store and the one or more candidate items for presenting in the item user interface based on a pattern of behavior by the user of selecting data stores and candidate items for associating with the collaborative workspace.

16. The computing device of claim 12, wherein the item locating module is configured to:
enable the user to narrow the list of candidate items presented in the item user interface based on user defined criteria through one or more of:
enabling the user to enter a search term in a search part displayed on the item user interface, and presenting a modified list of candidate items in the item user interface that excludes one or more items that do not satisfy the search term; and
enabling the user to enter filtering criteria in a filter part displayed on the item user interface, and presenting a modified list of candidate items in the item user interface that excludes one or more items that do not satisfy the filtering criteria.

17. The computing device of claim 12, wherein the item adding module is configured to enable the user to add one or more of the candidate items to the item presentation part of the interactive user interface by one or more of:
- selecting one or more of the candidate items from the list of candidate items presented in the item user interface and selecting an add file option displayed on the item user interface; and
- selecting one or more of the candidate items from the list of candidate items presented in the item user interface and performing a drag-and-drop operation to move the selected item into the item presentation part of the interactive user interface.

18. A computer-readable memory device with instructions stored thereon for managing item access in a network environment, instructions comprising:
- providing an interactive user interface through a display viewable on a plurality of electronic devices accessible over a network for enabling one or more users to collaborate on one or more items associated with a collaborative workspace, wherein at least a portion of a functionality and information provided on the interactive user interface are implemented on a local device and at least a portion of a functionality and information provided on the interactive user interface are implemented at a network accessible location;
- displaying on the display a menu part on the interactive user interface presenting a plurality of functions available for managing the collaborative workspace, wherein the collaborative workspace defines a linked collection of one or more of: members, permissions, items, activities, notifications, and messages and wherein items include one or more of: word processing document items, spreadsheet document items, presentation-related document items, data items, discussion items;
- displaying on the display a list of users associated with the collaborative workspace on the interactive user interface;
- displaying on the display the one or more items associated with the collaborative workspace in an item presentation part of the interactive user interface, wherein the workspace stores the items as one or more of: an actual copy and a virtual copy with a reference pointer pointing to where the items are stored;
- enabling a user with administrative rights to add and remove items from the item presentation part utilizing a workspace management module;
- displaying on the display one or more tasks assigned to one or more users associated with the collaborative workspace on an activity panel implemented by an activity management module on the interactive user interface and providing notifications to the one or more users associated with the collaborative workspace related to the status of the one or more tasks;
- displaying on the display a message thread in a discussion management module on the interactive user interface for enabling the one or more users associated with the collaborative workspace to exchange messages;
- enabling the user with administrative rights to select a documents option displayed on the menu part of the interactive user interface for executing the instruction to manage items associated with the collaborative workspace;
- upon detection of the selection of the documents option:
  - identifying at least one data store storing one or more candidate items relevant to the collaborative workspace;
  - selecting one or more candidate items from the data store for presenting in an item user interface; and
  - presenting the selected candidate items from the data store in a list of candidate items in the item user interface in a separate window overlapping with the interactive user interface enabling the user to view one or more candidate items for associating with the collaborative workspace without losing a context associated with the collaborative workspace;
- enabling the user to select one or more of the candidate items from the list of candidate items for associating with the collaborative workspace;
- adding the one or more selected candidate items from the list of candidate items to the item presentation part of the interactive user interface, wherein addition of the one or more selected candidate items to the collaborative workspace places the selected candidate item in a shared location to be accessed and acted upon by members of the workspace in a manner defined by respective permissions of the members; and
- displaying on the display a list of items on the display wherein the list of items includes additional information associated with each item including one or more of: a name associated with the item, a status of the item, an online status of a person associated with the item, a group associated with the item, and a last activity associated with the item.

19. The computer-readable memory device of claim 18, further comprising enabling the user to narrow the list of candidate items presented in the item user interface based on user defined criteria through one or more of:
- enabling the user to enter a search term in a search part displayed on the item user interface, and presenting a modified list of candidate items in the item user interface that excludes one or more items that do not satisfy the search term; and
- enabling the user to enter filtering criteria in a filter part displayed on the item user interface, wherein the filtering criteria include one or more of: file format, item author, user associated with an item, item type, and tagged criteria, and presenting a modified list of candidate items in the item user interface that excludes one or more items that do not satisfy the filtering criteria.

20. The computer-readable memory device of claim 18, further comprising:
- displaying a side panel part on the interactive user interface for displaying additional available functions for interacting with the collaborative workspace, wherein the available functions include one or more of:
  - an activity tab for enabling management of tasks and notifications associated with the collaborative workspace,
  - a discussion tab for enabling communication between the one or more users associated with the collaborative workspace, and
  - a clipboard tab for enabling the user to temporarily place items the user desires to associate with to the collaborative workspace.

* * * * *